US012797916B2

(12) United States Patent
Davis

(10) Patent No.: US 12,797,916 B2
(45) Date of Patent: Nov. 17, 2026

(54) STICKER REMOVAL KIT

(71) Applicant: Jacquie Davis, Vallejo, CA (US)

(72) Inventor: Jacquie Davis, Vallejo, CA (US)

( * ) Notice: Subject to any disclaimer, the term of this patent is extended or adjusted under 35 U.S.C. 154(b) by 480 days.

(21) Appl. No.: 18/370,142

(22) Filed: Sep. 19, 2023

(65) Prior Publication Data

US 2025/0091098 A1 Mar. 20, 2025

(51) Int. Cl.

*B08B 3/08* (2006.01)
*B08B 1/16* (2024.01)
*B60S 3/04* (2006.01)

(52) U.S. Cl.

CPC ................ *B08B 3/08* (2013.01); *B08B 1/165* (2024.01); *B60S 3/047* (2013.01); *B08B 2220/01* (2013.01)

(58) Field of Classification Search

CPC ... B08B 3/08; B08B 1/165; B08B 7/04; B60S 3/045

See application file for complete search history.

(56) References Cited

U.S. PATENT DOCUMENTS 1,726,017 A 8/1929 Enfants, Sr.
5,857,237 A 1/1999 Dranginis
6,618,894 B2 9/2003 Josdal
7,343,639 B2 * 3/2008 Dranginis .............. A47L 13/02 15/236.08
D759,328 S 6/2016 Cleere
2003/0060380 A1 3/2003 Ayarza

FOREIGN PATENT DOCUMENTS

CA 2385391 11/2002
KR 200491754 Y1 * 6/2020 ................ B60S 3/04
WO WO03035121 5/2003

* cited by examiner

*Primary Examiner* — Shay Karls

(57) ABSTRACT

A sticker removal kit for removing stickers from application surfaces includes a barrier comprising a panel which has a size and a shape such that the panel is configured for covering a sticker. The panel defines a recess on a rear side of the panel and is removably couplable to an application surface. A pouch is positionable in the recess of the panel, and a solvent is contained in the pouch for dissolving a sticker adhesive of the sticker.

18 Claims, 10 Drawing Sheets

STICKER REMOVAL KIT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sticker removal devices and more particularly pertains to a new sticker removal device for removing stickers from application surfaces.

(2) Description of Related Art Including Information Disclosed Under 37 CFR 1.97 and 1.98

Adhesives used to attach stickers to application surfaces can often present a challenge in removing the stickers from the application surfaces in one piece. The adhesives may be so strong and the stickers may comprise easily torn paper. Some stickers, such as parking violation stickers, may be particularly designed to create such a challenge, because the user does not want another to remove the sticker from the application surface. The challenge increases in difficulty when such stickers are placed on vertical or near-vertical surfaces because solvents which absorb the adhesives used will readily drain away from the sticker.

The prior art describes several scrapers and other sticker removal devices to help remove stickers from application surfaces, but it fails to disclose a kit comprising a barrier that couples to application surfaces and holds a pouch which contains a solvent. Such a kit may facilitate removal of the sticker through a process of opening the pouch when the barrier holds the pouch against the application surface to release the solvent and hold the solvent against the sticker. After the solvent absorbs at least some of the sticker's adhesive, the sticker may be scraped off, such as with a scraper.

BRIEF SUMMARY OF THE INVENTION

An embodiment of the disclosure meets the needs presented above by generally comprising a barrier comprising a panel which has a size and a shape such that the panel is configured for covering a sticker. The panel defines a recess on a rear side of the panel and is removably couplable to an application surface. A pouch is positionable in the recess of the panel, and a solvent is contained in the pouch for dissolving a sticker adhesive of the sticker.

Another embodiment of the disclosure includes a method of removing a sticker from an application surface. The method comprises coupling a panel to the application surface when a pouch containing a solvent is positioned in a recess on a rear side of the panel such that the rear side of the panel covers the sticker and the pouch lies adjacent to the sticker. The pouch is opened to release the solvent from the pouch and into the recess such that the solvent lies against the sticker. The solvent dissolves a sticker adhesive which bonds the sticker to the application surface. The panel is removed from the application surface to release the solvent from the sticker. The sticker is removed from the application surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
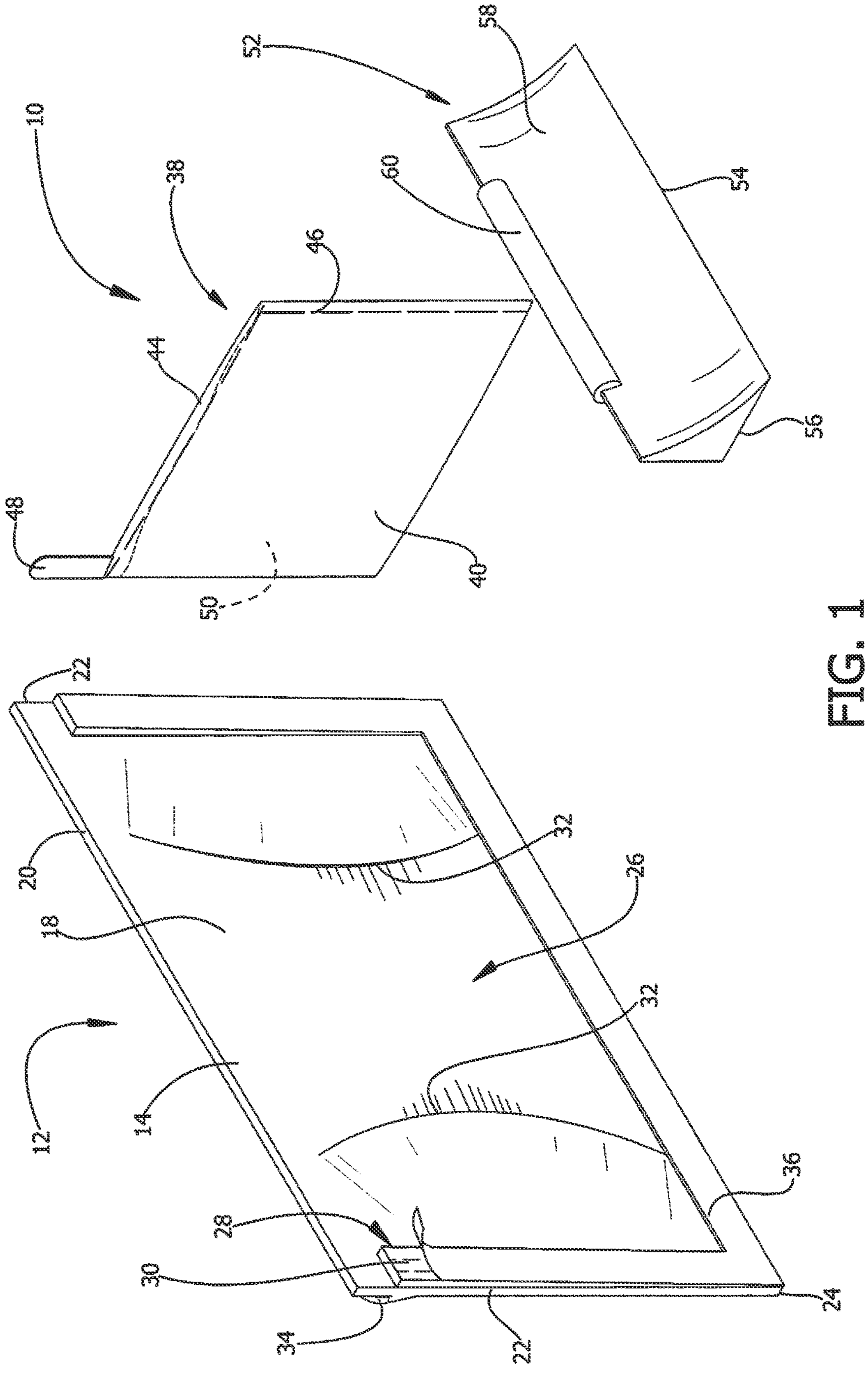
FIG. 1 is a perspective kit view of a sticker removal kit according to an embodiment of the disclosure.
Figure 2:
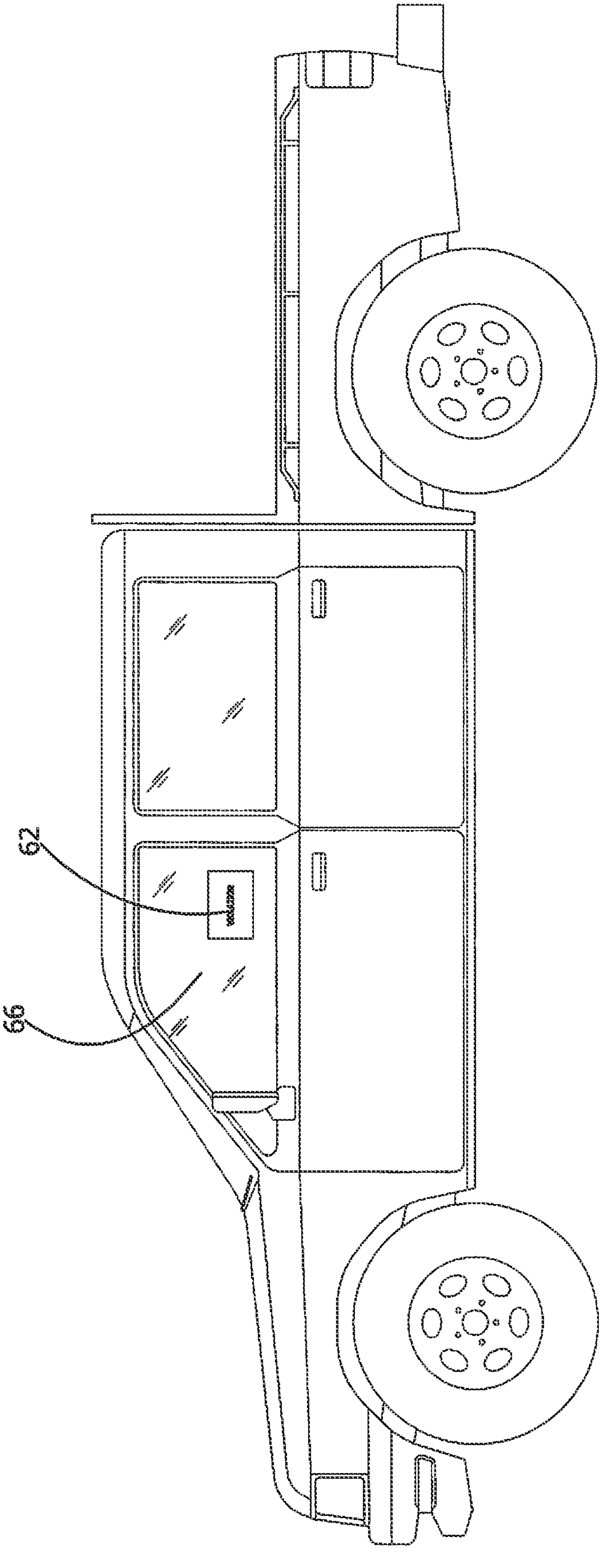
FIG. 2 is a side view of a vehicle with a sticker adhered to an application surface, the application surface being defined by a window of the vehicle.
Figure 3:
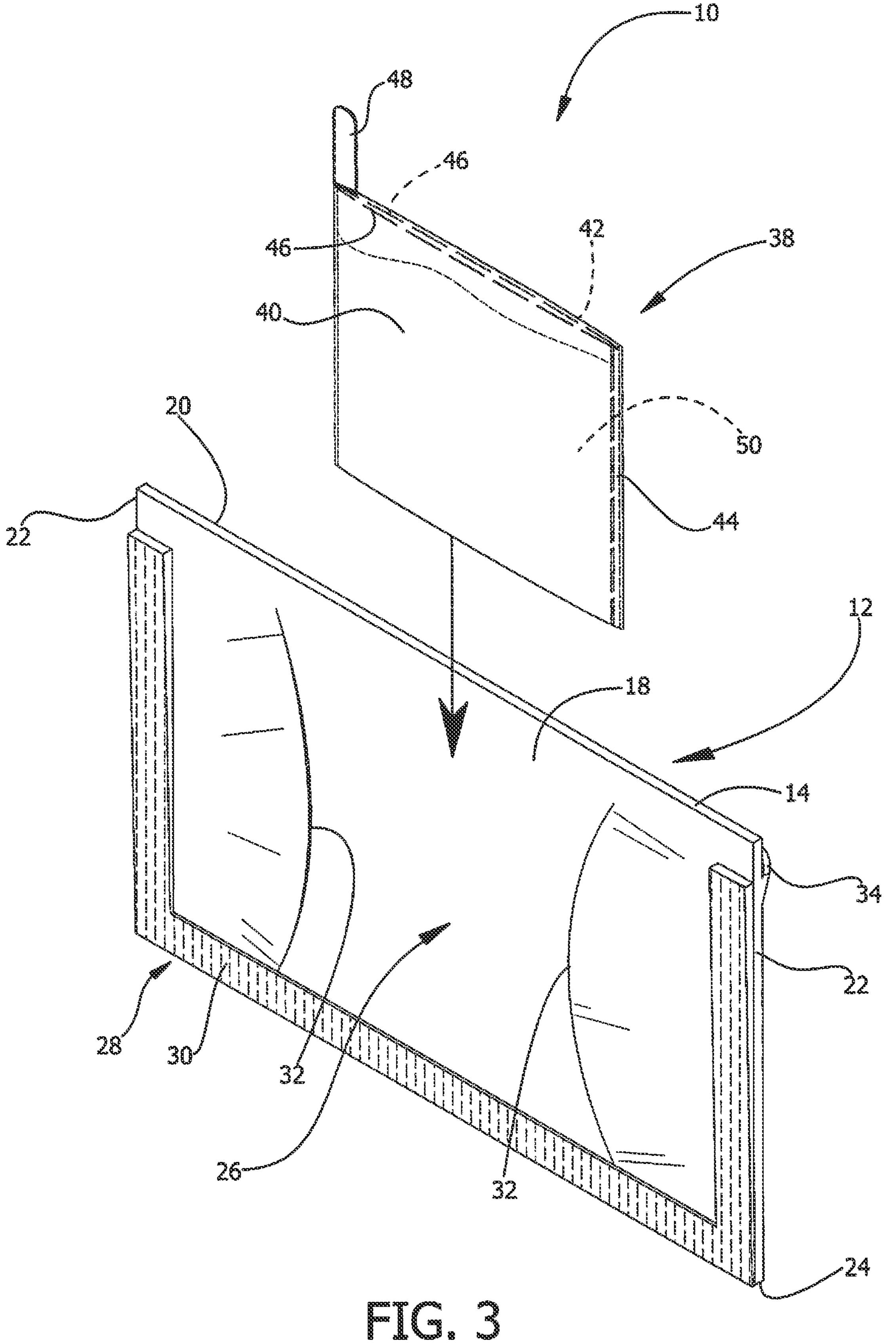
FIG. 3 is a perspective view of an embodiment of the disclosure in which a pouch is being inserted into a recess on a rear side of a panel.
Figure 4:
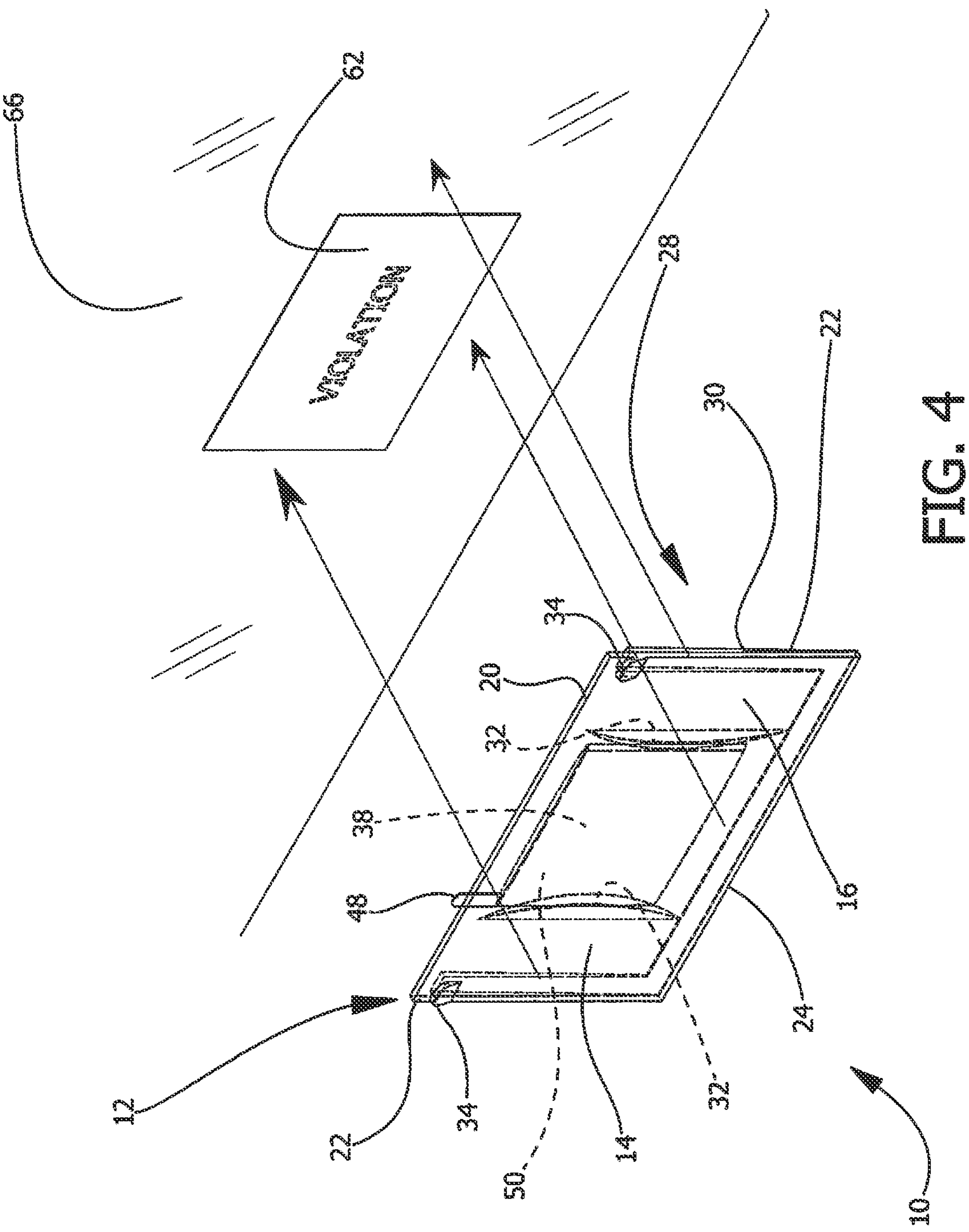
FIG. 4 is a perspective view of an embodiment of the disclosure in which a panel and a pouch are being attached to an application surface over a sticker.
Figure 5:
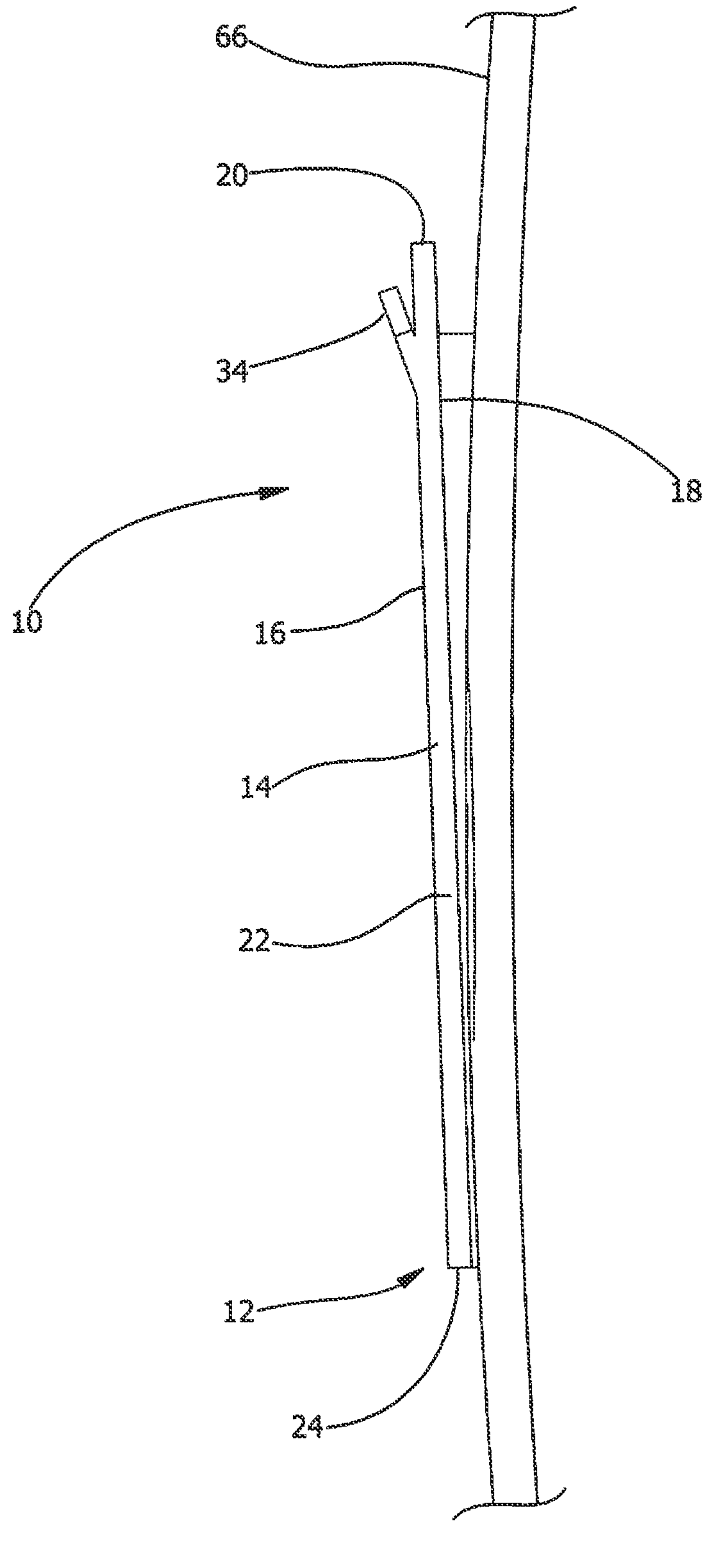
FIG. 5 is a side in-use view of an embodiment of the disclosure in which a panel is adhered to an application surface and contains a pouch.
Figure 6:
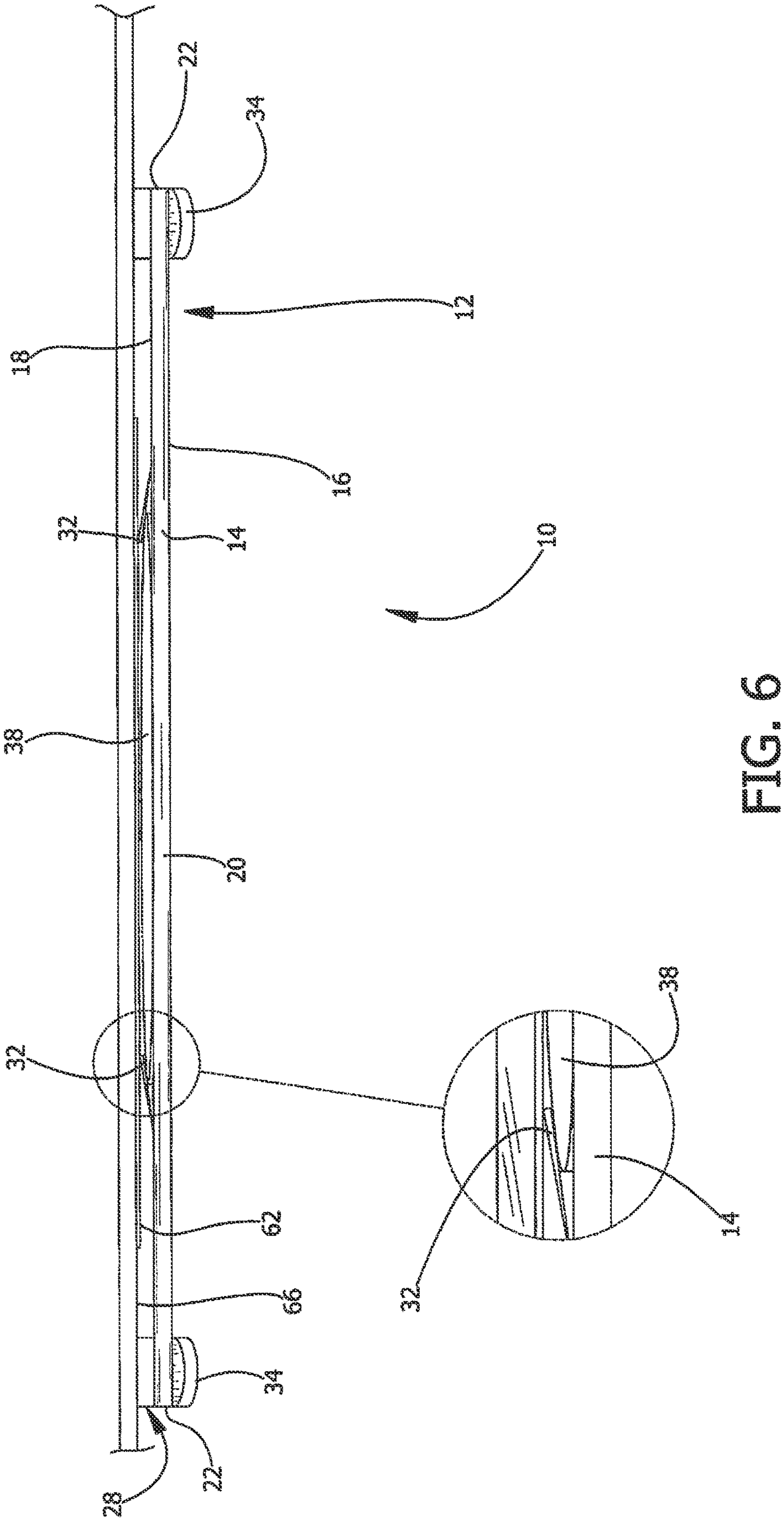
FIG. 6 is a top in-use view of an embodiment of the disclosure in which a panel is adhered to an application surface and contains a pouch.
Figure 7:
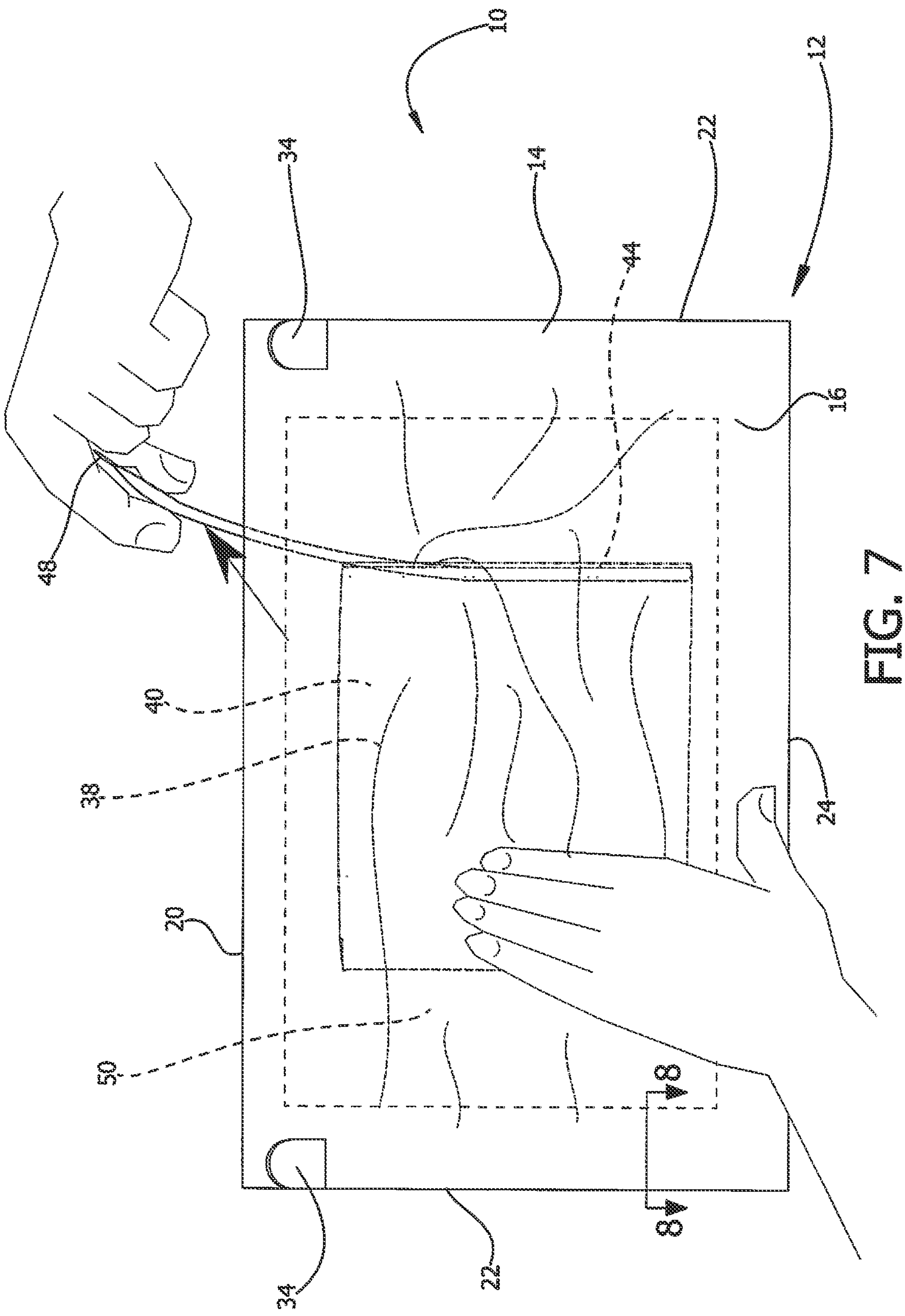
FIG. 7 is a front in-use view of an embodiment of the disclosure in which a panel is adhered to an application surface and contains a pouch. The pouch is being opened by gripping an opener tab of the pouch and tearing the pouch open.
Figure 8:
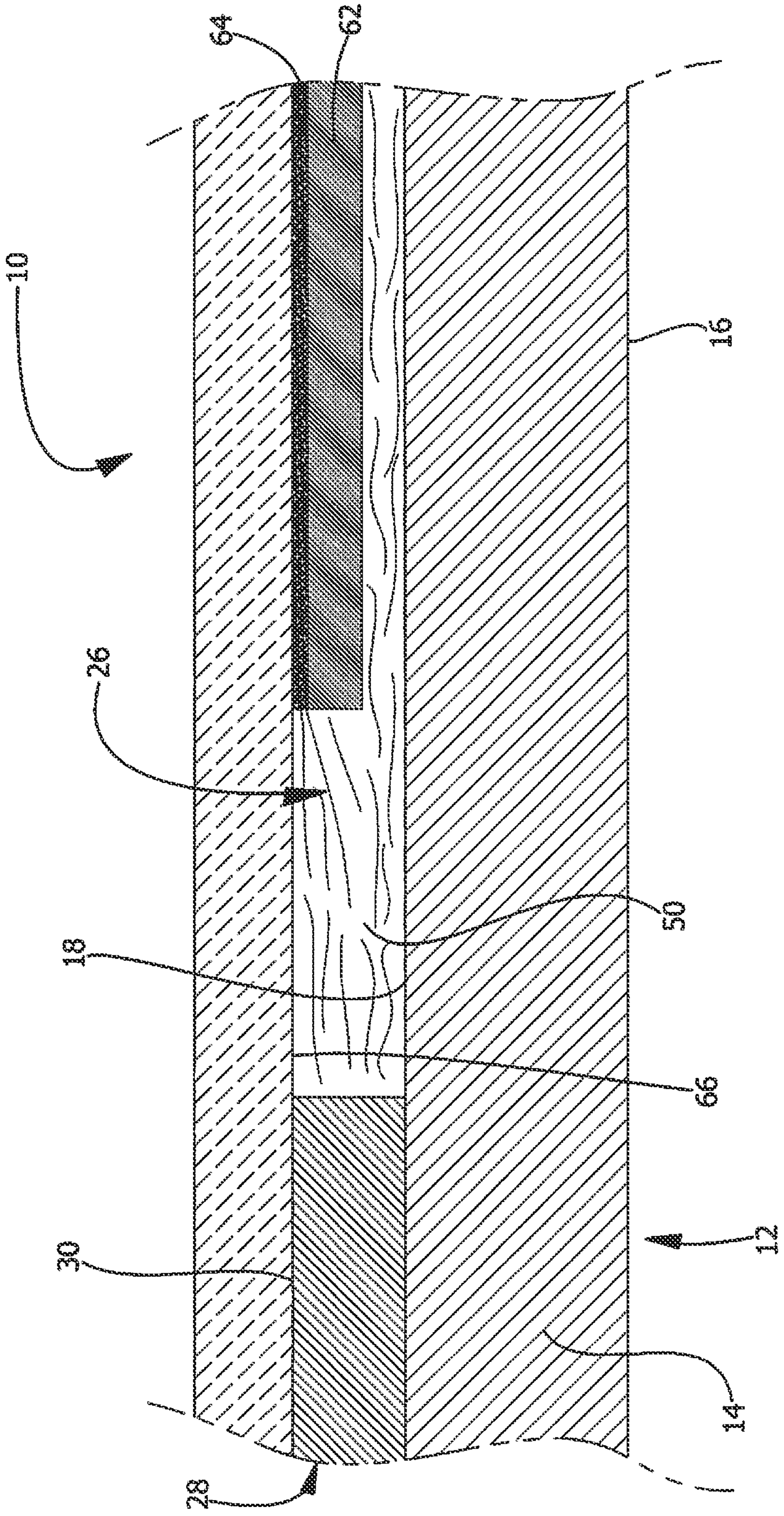
FIG. 8 is a cross-sectional view of an embodiment of the disclosure taken from Arrows 8-8 in FIG. 7.
Figure 9:
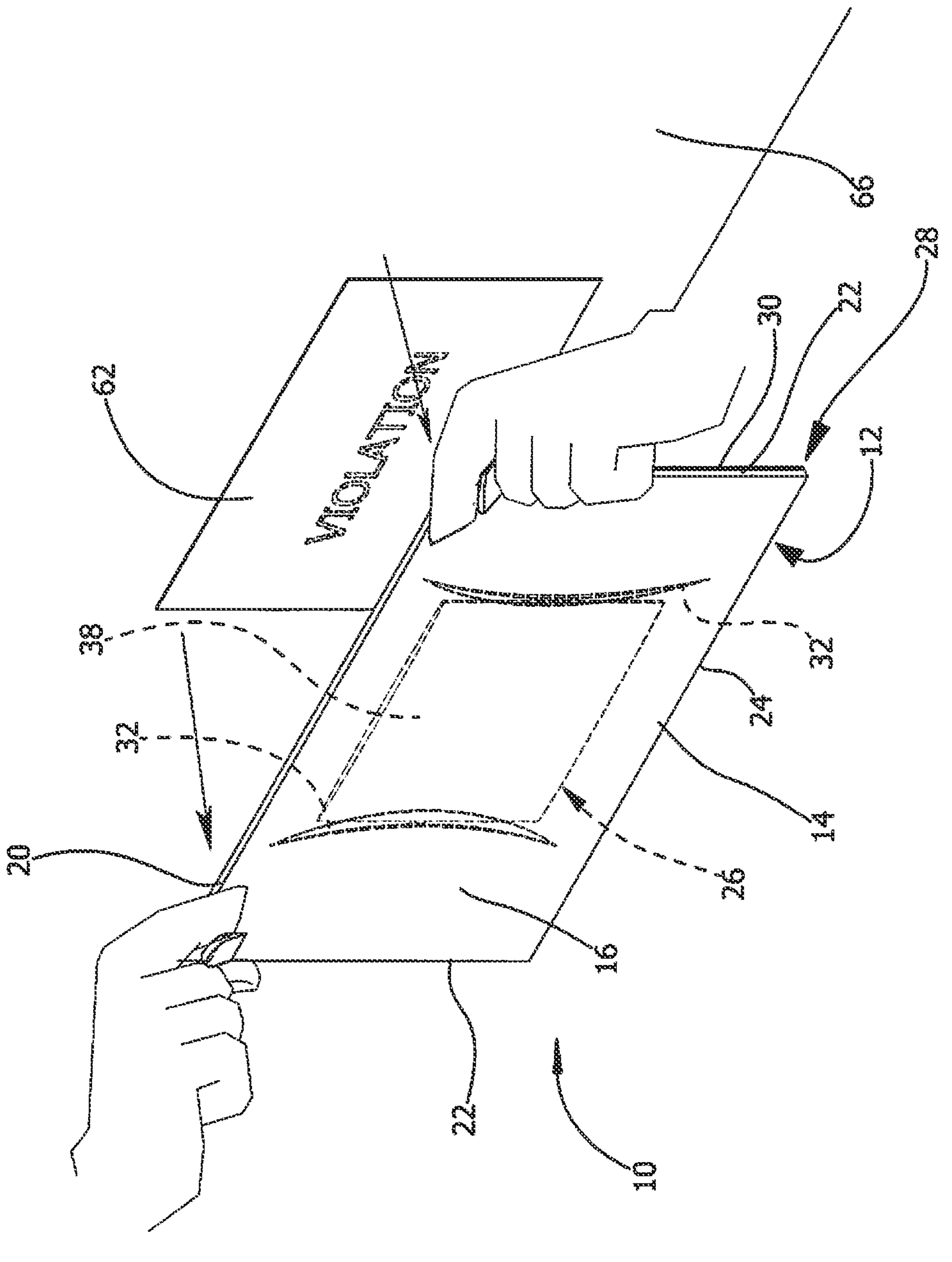
FIG. 9 is a perspective view of an embodiment of the disclosure in which a panel and a pouch are being removed from an application surface.
Figure 10:
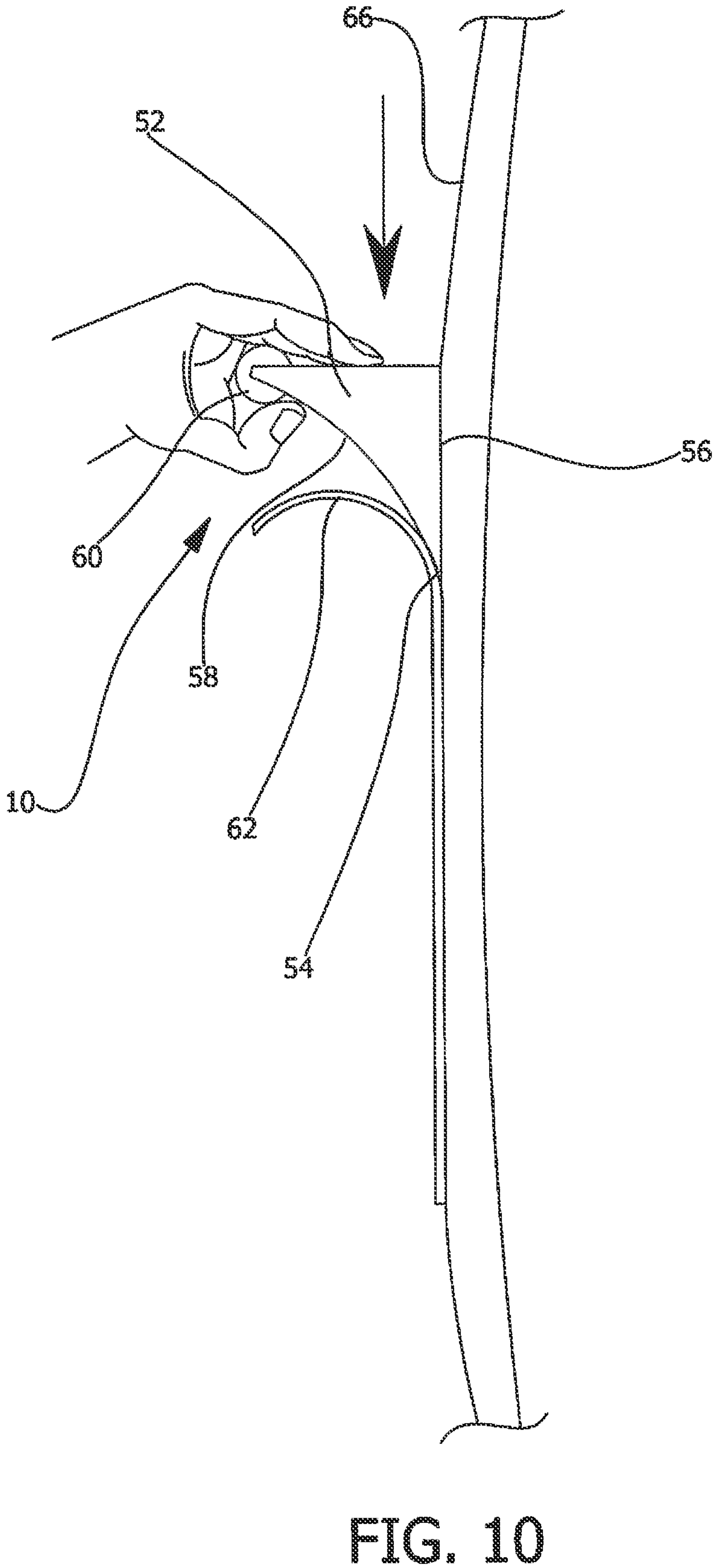
FIG. 10 is a side view of an embodiment of the disclosure in which a sticker is being removed from an application surface via a scraper.

With reference now to the drawings, and in particular to FIGS. 1 through 10 thereof, a new sticker removal device embodying the principles and concepts of an embodiment of the disclosure and generally designated by the reference numeral 10 will be described.

As best illustrated in FIGS. 1 through 10, the sticker removal kit 10 generally comprises a barrier 12 comprising a panel 14 the panel 14 having a size and a shape such that the panel 14 is configured for covering a sticker 62. The panel 14 defines a recess 26 on a rear side 18 of the panel 14. The barrier 12 also comprises connector 28 which is coupled to the rear side 18 of the panel 14. The connector 28 comprises a barrier adhesive 30 such that the connector 28 is configured for connecting the panel 14 to an application surface 66 and forming a seal with the application surface 66. The connector 28 has a U-shape and extends along a pair of lateral edges 22 and a lower edge 24 of the panel 14.

A pair of retaining ledges 32 of the barrier 12 is coupled to the rear side 18 of the panel 14 and extends over the recess 26. The retaining ledges 32 are laterally spaced from each other across the recess 26. A pair of removal tabs 34 of the barrier 12 is coupled to a front side 16 of the panel 14. Each removal tab 34 of the pair of removal tabs 34 is positioned adjacent to an associated lateral edge 22 of the pair of lateral edges 22 of the panel 14. A barrier adhesive cover 36 is removably coupled to the barrier adhesive 30. The barrier adhesive cover 36 is configured for preventing the panel 14 from inadvertently adhering to other objects and is removed prior to adhering the panel 14 to the application surface 66.

A pouch 38 is positionable in the recess 26 of the panel 14, and a solvent 50 is contained in the pouch 38. The solvent 50 is configured to dissolve a sticker adhesive 64 of the sticker 62. The pouch 38 comprises a first wall 40, a second wall 42, and a perimeter wall 44, wherein the perimeter wall 44 is coupled to and extends between the first wall 40 and the second wall 42. The first wall 40 is integrally formed with the second wall 42 and the perimeter wall 44. The pouch 38 has a pair of creases 46, each of which is positioned at an associated junction of a junction of the first wall 40 and the perimeter wall 44 and a junction of the second wall 42 and the perimeter wall 44. The pair of creases 46 facilitate tearing the perimeter wall 44 from the first wall 40 and the second wall 42 to open the pouch 38 and release the solvent 50 therefrom. The pouch 38 further comprises an opener tab 48 which is coupled to the perimeter wall 44 of the pouch 38.

A scraper 52 is provided which tapers to a scraping edge 54 such that the scraping edge 54 of the scraper 52 is configured to be inserted between the sticker 62 and the application surface 66. The scraper 52 has a planar surface 56 and a concavely arcuate surface 58 which join at the scraping edge 54. The scraper 52 also comprises a handle 60 which is positioned opposite the planar surface 56.

The sticker removal kit 10 is used to remove the sticker 62 from the application surface 66 as detailed below. The sticker removal kit 10 is particularly intended to be used when the application surface 66 is positioned in a non-horizontal orientation such that the solvent 50 is less likely to drain past a gap formed between the upper edge 20 of the panel 14 and the application surface 66. But, the sticker removal kit 10 also may be used on the application surface 66 when the application surface is oriented in a horizontal orientation.

As depicted in FIGS. 2 through 10, another embodiment of the disclosure includes a method of removing a sticker 62 from an application surface 66 which also describes a use of the sticker removal kit 10. The method comprises inserting a pouch 38 into a recess 26 on a rear side 18 of a panel 14 and coupling the panel 14 to an application surface 66 such that the rear side 18 of the panel 14 covers the sticker 62 and the pouch 38 lies adjacent to the sticker 62. A pair of retaining ledges 32 on the rear side 18 of the panel 14 retain the pouch 38 in the recess 26. The pouch 38 comprises a first wall 40, a second wall 42, and a perimeter wall 44, and the perimeter wall 44 is coupled to and extends between the first wall 40 and the second wall 42. The pouch 38 is positioned such that an opener tab 48 of the pouch 38 which is coupled to the perimeter wall 44 extends past an upper edge 20 of the panel 14. When coupling the panel 14 to the application surface 66, a seal is formed between the panel 14 and the application surface 66 on a pair of lateral edges 22 and a lower edge 24 of the panel 14. The seal may be made, for example, by a barrier adhesive 30 mounted on the panel 14. In some embodiments, the pouch 38 may seal to the application surface 66.

The pouch 38 is opened, such as by pulling the opener tab 48 to tear open the pouch 38, to release the solvent 50 from the pouch 38 and into the recess 26 such that the solvent 50 lies against the sticker 62. The seal retains the solvent 50 against the sticker 62, and the solvent 50 dissolves a sticker adhesive 64 which bonds the sticker 62 to the application surface 66. The panel 14 is removed by the application surface 66, which may be done by gripping and pulling one or both of a pair of removal tabs 34 coupled to a front side 16 of the panel 14. The solvent 50 is thereby released from the sticker 62 and may be collected in a container, absorbed by a cloth, allowed to drain away, or the like. The sticker 62 is removed from the application surface 66, such as by scraping the sticker 62 off by a scraper 52.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A sticker removal kit for removing a sticker from an application surface, the kit comprising:

a barrier comprising a panel, the panel having a size and a shape such that the panel is configured for covering the sticker, the panel defining a recess on a rear side of the panel, the panel being removably couplable to the application surface;

a pouch being positionable in the recess of the panel;

a solvent being contained in the pouch, the solvent being configured to dissolve a sticker adhesive of the sticker; and wherein the barrier further comprises a pair of retaining ledges being coupled to the rear side of the panel and extending over the recess, the pair of retaining ledges being laterally spaced from each other across the recess.

2. The kit of claim 1, wherein the barrier further comprises a connector being coupled to the rear side of the panel and being configured to mount the panel to the application surface, the connector comprising a barrier adhesive such that the connector is configured for connecting the panel to the application surface and forming a seal with the application surface.

3. The kit of claim 2, wherein the connector has a U-shape, the connector extending along a pair of lateral edges and a lower edge of the panel.

4. The kit of claim 2, wherein the barrier further comprises a barrier adhesive cover being removably coupled to the barrier adhesive, the barrier adhesive cover being configured for preventing the panel from inadvertently adhering to other objects.

5. The kit of claim 1, wherein the barrier further comprises a pair of removal tabs being coupled to a front side of the panel, each removal tab of the pair of removal tabs being positioned adjacent to an associated lateral edge of the pair of lateral edges of the panel.

6. The kit of claim 1, wherein the pouch comprises a first wall, a second wall, and a perimeter wall, the perimeter wall being coupled to and extending between the first wall and the second wall, the first wall being integrally formed with the second wall and the perimeter wall.

7. The kit of claim 1, further comprising a scraper which tapers to a scraping edge such that the scraping edge of the scraper is configured to be inserted between the sticker and the application surface.

8. The kit of claim 7, wherein the scraper has a planar surface and a concavely arcuate surface which join at the scraping edge, the scraper comprising a handle being positioned opposite the planar surface.

9. A sticker removal kit for removing a sticker from an application surface, the kit comprising:

a barrier comprising a panel, the panel having a size and a shape such that the panel is configured for covering the sticker, the panel defining a recess on a rear side of the panel, the panel being removably couplable to the application surface;

a pouch being positionable in the recess of the panel;

a solvent being contained in the pouch, the solvent being configured to dissolve a sticker adhesive of the sticker;

wherein the pouch comprises a first wall, a second wall, and a perimeter wall, the perimeter wall being coupled to and extending between the first wall and the second wall, the first wall being integrally formed with the second wall and the perimeter wall; and wherein the pouch has a pair of creases, each crease of the pair of creases being positioned at an associated junction of a junction of the first wall and the perimeter wall and a junction of the second wall and the perimeter wall, the pair of creases facilitating tearing the perimeter wall from the first wall and the second wall.

10. A sticker removal kit for removing a sticker from an application surface, the kit comprising:

a barrier comprising a panel, the panel having a size and a shape such that the panel is configured for covering the sticker, the panel defining a recess on a rear side of the panel, the panel being removably couplable to the application surface;

a pouch being positionable in the recess of the panel;

a solvent being contained in the pouch, the solvent being configured to dissolve a sticker adhesive of the sticker;

wherein the pouch comprises a first wall, a second wall, and a perimeter wall, the perimeter wall being coupled to and extending between the first wall and the second wall, the first wall being integrally formed with the second wall and the perimeter wall; and wherein the pouch further comprises an opener tab being coupled to the perimeter wall of the pouch.

11. A sticker removal kit for removing a sticker from an application surface, the kit comprising:

a barrier comprising:

a panel, the panel having a size and a shape such that the panel is configured for covering the sticker, the panel defining a recess on a rear side of the panel;

a connector being coupled to the rear side of the panel, the connector comprising a barrier adhesive such that the connector is configured for connecting the panel to the application surface and forming a seal with the application surface, the connector having a U-shape, the connector extending along a pair of lateral edges and a lower edge of the panel;

a pair of retaining ledges being coupled to the rear side of the panel and extending over the recess, the pair of retaining ledges being laterally spaced from each other across the recess;

a pair of removal tabs being coupled to a front side of the panel, each removal tab of the pair of removal tabs being positioned adjacent to an associated lateral edge of the pair of lateral edges of the panel; and a barrier adhesive cover being removably coupled to the barrier adhesive, the barrier adhesive cover being configured for preventing the panel from inadvertently adhering to other objects;

a pouch being positionable in the recess of the panel, the pouch comprising a first wall, a second wall, and a perimeter wall, the perimeter wall being coupled to and extending between the first wall and the second wall, the first wall being integrally formed with the second wall and the perimeter wall, the pouch having a pair of creases, each crease of the pair of creases being positioned at an associated junction of a junction of the first wall and the perimeter wall and a junction of the second wall and the perimeter wall, the pair of creases facilitating tearing the perimeter wall from the first wall and the second wall, the pouch further comprising an opener tab being coupled to the perimeter wall of the pouch;

a solvent being contained in the pouch, the solvent being configured to dissolve a sticker adhesive of the sticker; and a scraper which tapers to a scraping edge such that the scraping edge of the scraper is configured to be inserted between the sticker and the application surface, the scraper having a planar surface and a concavely arcuate surface which join at the scraping edge, the scraper comprising a handle being positioned opposite the planar surface.

12. A method of removing a sticker from an application surface, the method comprising:

with a pouch containing a solvent being positioned in a recess on a rear side of a panel, coupling the panel to the application surface such that the rear side of the panel covers the sticker and the pouch lies adjacent to the sticker;

opening the pouch, thereby releasing the solvent from the pouch and into the recess such that the solvent lies against the sticker;

dissolving, via the solvent, a sticker adhesive which bonds the sticker to the application surface;

removing the panel from the application surface, thereby releasing the solvent from the sticker; and removing the sticker from the application surface.

13. The method of claim 12, further comprising inserting the pouch into the recess on the rear side of a panel.

14. The method of claim 13, further comprising retaining, via a pair of retaining ledges on the rear side of the panel, the pouch in the recess.

15. The method of claim 12, further comprising positioning the pouch in the recess such that an opener tab of the pouch extends past an upper edge of the panel, wherein the pouch comprises a first wall, a second wall, and a perimeter wall, the perimeter wall being coupled to and extending between the first wall and the second wall, the opener tab being coupled to the perimeter wall of the pouch.

16. The method of claim 15, wherein the step of opening the pouch comprises pulling the opener tab of the pouch to tear open the pouch.

17. The method of claim 12, wherein the step of coupling the panel to the application surface further comprises forming a seal between the panel and the application surface on a pair of lateral edges and a lower edge of the panel, and further comprising retaining, via the seal, the solvent against the sticker.

18. The method of claim 12, wherein the step of removing the sticker from the application surface further comprises scraping, via a scraper, the sticker from the application surface.

* * * * *